(12) United States Patent
Chen et al.

(10) Patent No.: US 7,518,857 B2
(45) Date of Patent: Apr. 14, 2009

(54) MOUNTING APPARATUS FOR DATA STORAGE DEVICE

(75) Inventors: Yun-Lung Chen, Tu-Cheng (TW); Quan-Guang Du, Shenzhen (CN); Qi Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 363 days.

(21) Appl. No.: 11/309,119

(22) Filed: Jun. 23, 2006

(65) Prior Publication Data

US 2007/0297128 A1 Dec. 27, 2007

(51) Int. Cl.
*H05K 5/00* (2006.01)
*H05K 7/00* (2006.01)
*G06F 1/16* (2006.01)

(52) U.S. Cl. .................. 361/685; 361/684; 361/686

(58) Field of Classification Search ............... 361/685, 361/684, 686
See application file for complete search history.

(56) References Cited

U.S. PATENT DOCUMENTS

| | | | |
|---|---|---|---|
| 6,227,516 B1 | 5/2001 | Webster, Jr. et al. | |
| 6,305,660 B1 * | 10/2001 | Liao | 248/694 |
| 6,556,434 B1 | 4/2003 | Chan et al. | |
| 6,956,737 B2 | 10/2005 | Chen et al. | |
| 7,204,469 B2 * | 4/2007 | Chen et al. | 248/694 |
| 7,259,959 B2 * | 8/2007 | Tu et al. | 361/685 |
| 2004/0252452 A1 * | 12/2004 | Chen | 361/685 |
| 2005/0052841 A1 * | 3/2005 | Chen et al. | 361/685 |
| 2005/0068721 A1 * | 3/2005 | Chen et al. | 361/685 |
| 2007/0279860 A1 * | 12/2007 | Zheng et al. | 361/685 |

* cited by examiner

*Primary Examiner*—Jayprakash N Gandhi
*Assistant Examiner*—Anthony M Haughton
(74) *Attorney, Agent, or Firm*—Wei Te Chung

(57) ABSTRACT

A mounting apparatus for retaining a data storage device (60) in a computer includes a bracket (10) and a driving member (30). The data storage device defines a locking hole (63) therein. The bracket includes a first side panel (12) and a second side panel (11) for mounting the data storage device therebetween. A resilient retaining member (126) is formed at the first side panel (12). A retaining tab (1264) is formed on a free end of the retaining member corresponding to the locking hole of the data storage device. The driving member is pivotably attached on the first side panel. An actuating portion (373) is formed on the driving member for urging movement of the retaining member.

17 Claims, 5 Drawing Sheets ically from opposite edges of the bottom panel 13 respectively. A holding space is defined between the bottom panel 13 and the two side panels 11, 12 for holding the data storage devices 60 therein. Two guiding tabs 112 are formed inward from the side panel 11 and parallel to the bottom panel 13 in the holding space. A plurality of resilient tongues 114 is formed on the side panel 11 for pressing against the data storage devices 60. Two guiding tabs 122 are formed in the side panel 12 corresponding to the guiding tabs 112 of the side panel 11 respectively. A pair of resilient retaining members 126 is formed at and parallel to the side panel 12. A free end of each retaining member 126 perpendicularly extends away from the holding space and a driving post 1262 is formed thereon. A retaining tab 1264 protrudes in towards the side panel 11 from each retaining member 126. Two clasps 127a, 127b are respectively formed on the side panel 12. Two pivoting posts 124 protrude out on the side panel 12. A resilient positioning tongue 129 is formed on the side panel 12 between the two pivoting posts 124. A free distal end of the positioning tongue 129 extends out from the holding space, and a protrusion 1292 is formed thereon.

MOUNTING APPARATUS FOR DATA STORAGE DEVICE

FIELD OF THE INVENTION

The present invention relates to a mounting apparatus, and more particularly to an apparatus for readily mounting a data storage device to a computer.

DESCRIPTION OF RELATED ART

Conventionally, the method of mounting a data storage device, such as a hard disk or a CD-ROM (compact disk-read only memory) to a computer was to simply screw the data storage device to a chassis or a bracket of the computer. However, insertion or removal of the screws from the data storage device was laborious and time-consuming.

As computers improved, various devices were developed to facilitate installation and removal of disk drives. One such mounting tray for a hard disk drive has a base, a front wall, and a pair of side walls. A pair of latching mechanisms is located in each side wall. Each latching mechanism has a slide and a spring-like fastener. The fasteners have an unlocked position where they are biased away from the tray, and a locked position where the slides capture them against the side walls. A tapered pin extends inward from each fastener. With the latching mechanisms in their unlocked positions, a drive is placed in the tray. The slides are then moved to the locked positions such that the pins on the fasteners engage holes in the drive. The pins secure the drive from movement relative to the tray to facilitate hot plugging of the drive into a computer system. However, the spring-like fastener may wear out with frequent use, and also it is not easy to operate the slide when securing or removing the disk drives.

What is needed, therefore, is a apparatus having simplified configuration for ease in mounting disk drives to a computer enclosure.

SUMMARY OF THE INVENTION

A mounting apparatus for retaining a data storage device includes a bracket and a driving member. The data storage device defines a locking hole therein. The bracket includes a first side panel and a second side panel for mounting the data storage device therebetween. A resilient retaining member is formed at the first side panel. A retaining tab is formed on a free end of the retaining member corresponding to a locking hole of the data storage device. The driving member is pivotably attached on the first side panel. An actuating portion is formed on the driving member for urging movement of the retaining member.

Other advantages and novel features will be drawn from the following detailed description of a preferred embodiment with attached drawings, in which:

BRIEF DESCRIPTION OF THE DRAWINGS

FIG. 4 is an assembled view of FIG. 1; and.

DETAILED DESCRIPTION OF THE INVENTION

Figure 1:
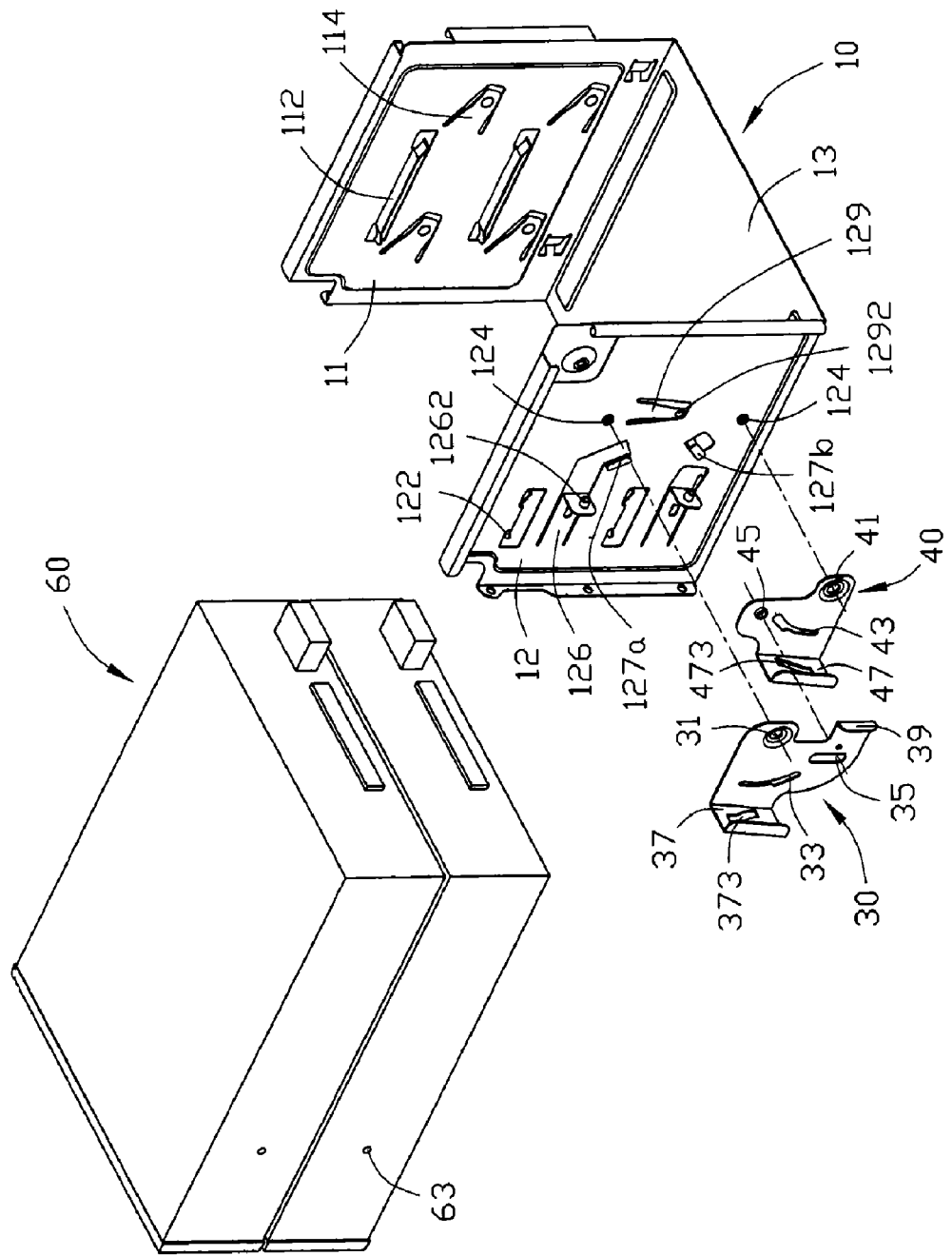
FIG. 1 is an exploded, isometric view of a mounting apparatus for a data storage device of a preferred embodiment of the present invention, the mounting apparatus including a bracket, a first driving member, and a second driving member.

Referring to FIG. 1, a mounting apparatus for data storage devices 60 includes a bracket 10, a first driving member 30, and a second driving member 40.

Figure 2:
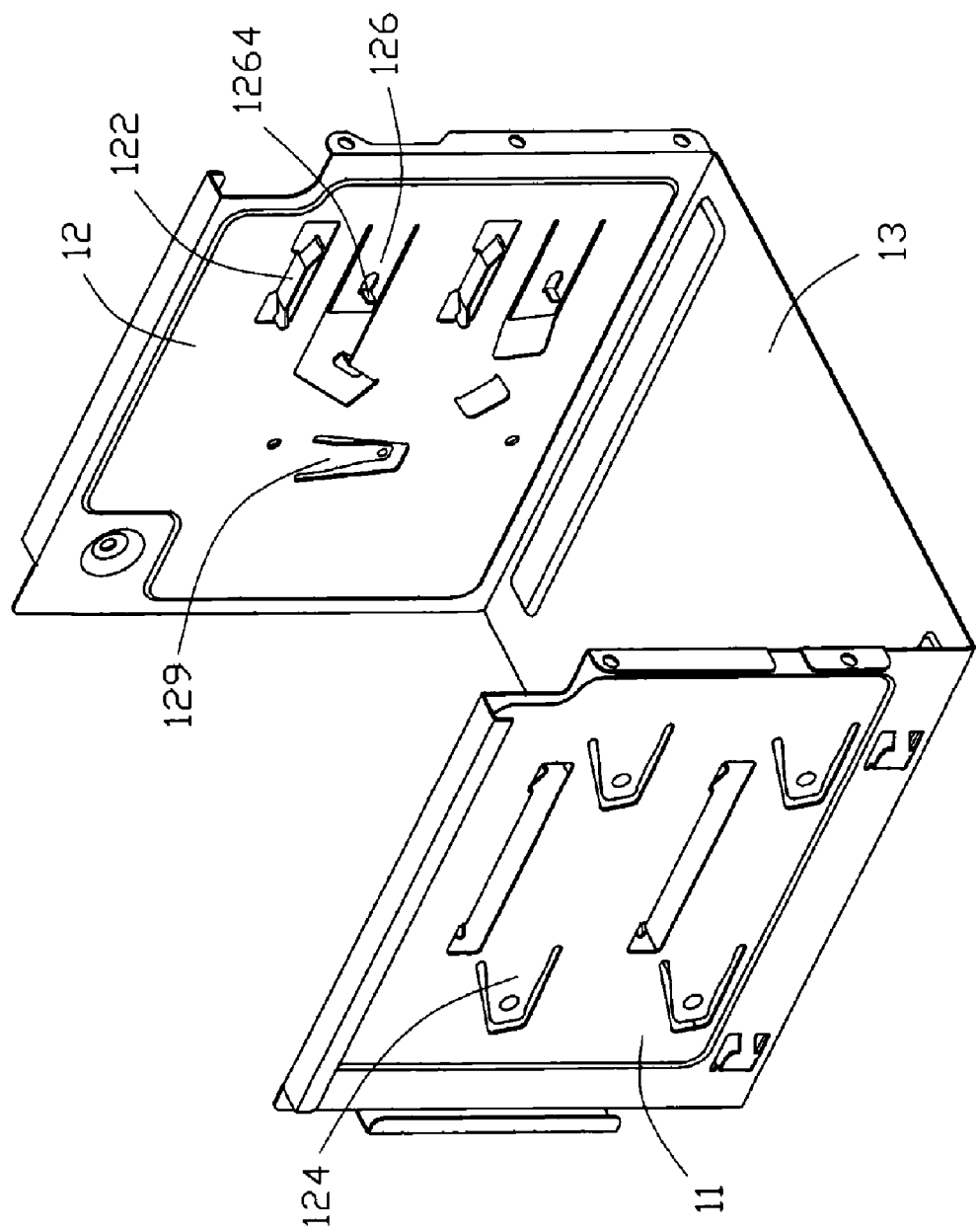
FIG. 2 is an enlarged, isometric view of the bracket of FIG. 1.

Referring also to FIG. 2, the bracket 10 includes a bottom panel 13, and a pair of side panels 11, 12 extending perpendicularly from opposite edges of the bottom panel 13 respectively.

Figure 3:
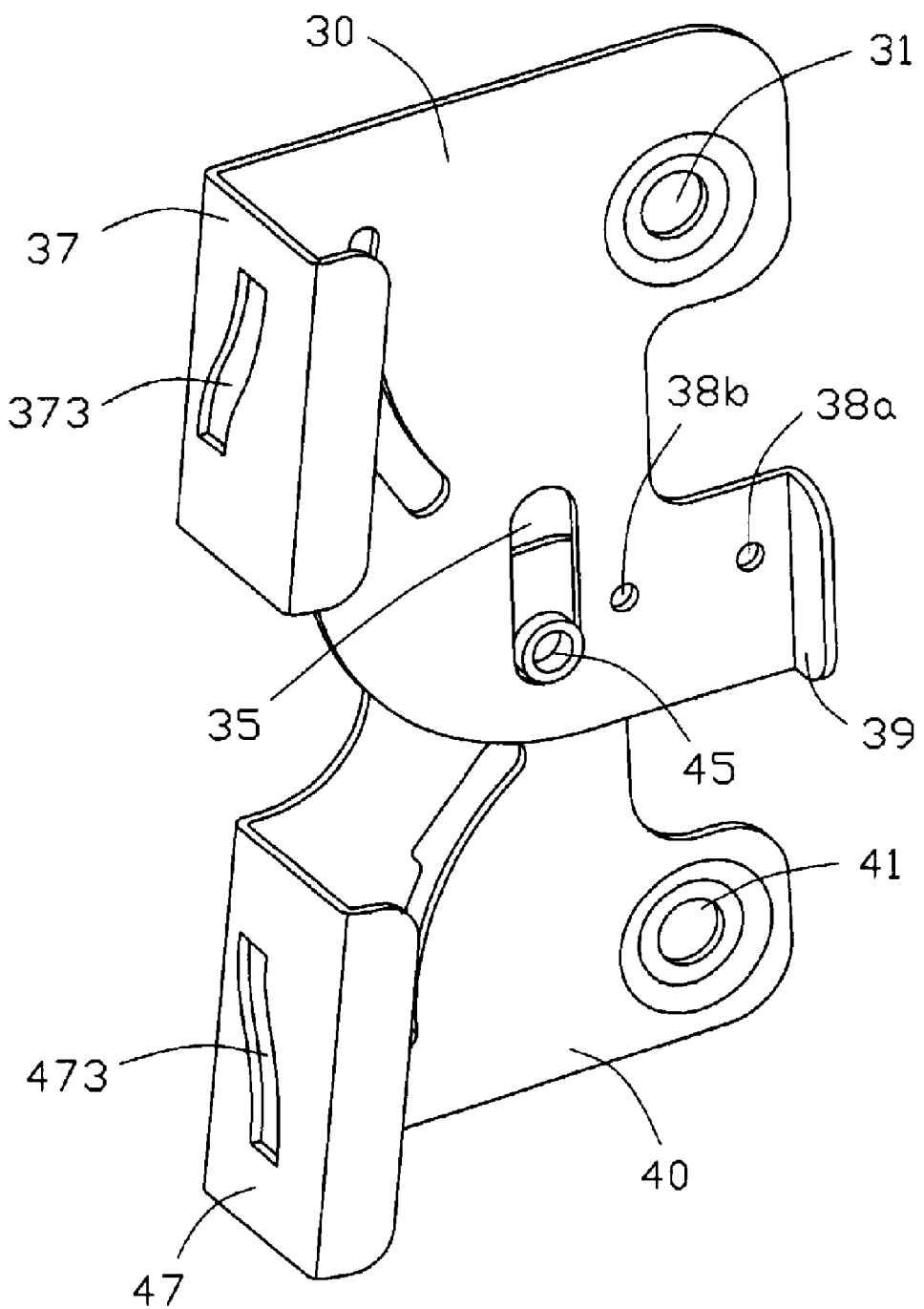
FIG. 3 is an enlarged, assembled view of the first driving member and the second driving member of FIG. 1.

Referring also to FIG. 3, two pivoting holes 31, 41 are respectively defined in the first driving member 30 and the second driving member 40, corresponding to the pivoting posts 124 of the side panel 12. Two arcuate slots 33, 43 are respectively defined in the first driving member 30 and the second driving member 40 for receiving the corresponding clasps 127a, 127b of the side panel 12. A driving post 45 is formed on the second driving member 40. The first driving member 30 defines a restricting slot 35 for holding the driving post 45. Two actuating portions 37 and 47 are respectively bent from one side edge of the first driving member 30 and the second driving member 40 corresponding to the retaining members 126 of the side panel 12. Two curved slots 373, 473 are respectively defined in the actuating portions 37 and 47 of the first driving member 30 and the second driving member 40, for engaging with the driving posts 1262. A distance from an end of each slot 373, 473 to the first side panel 12 is greater than a distance from the other end of each slot 373, 473 to the side panel 12. A pair of positioning accesses or position holes 38a, 38b are defined in the first driving member 30 for selectively receiving the protrusion 1292 of the side panel 12. An operating portion 39 extends from the first driving member 30 on an edge away from the actuating portion 37.

Each data storage device 60 defines a locking hole 63 in one side thereof for receiving the corresponding retaining tab 1264.

Figure 4:
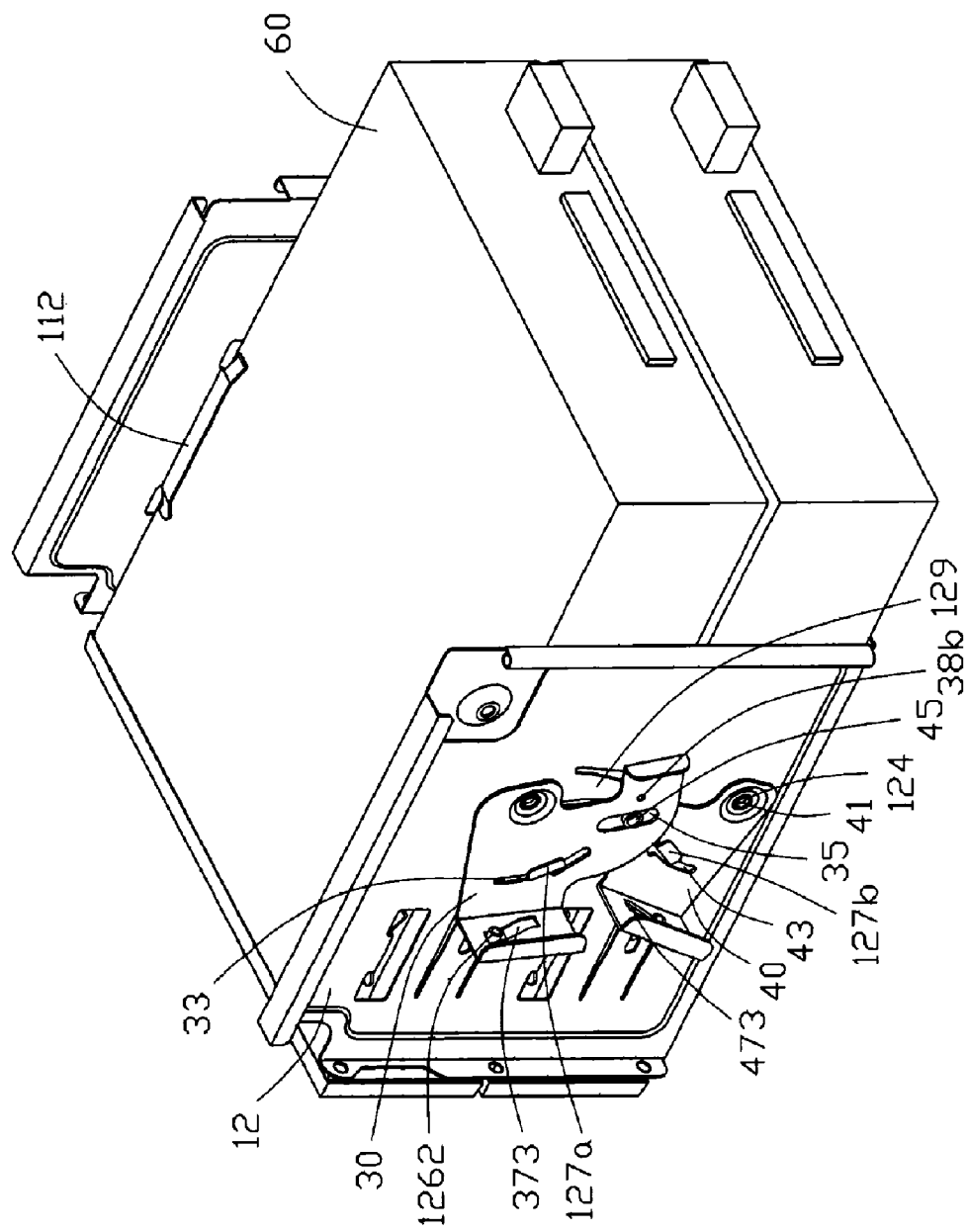

Referring also to FIG. 4, when assembling the first driving member 30 and the second driving member 40 to the bracket 10, the clasps 127a and 127b are respectively received in the corresponding arcuate slots 33 and 43 of the first driving member 30 and the second driving member 40. The pivoting posts 124 are respectively pivotably received in the pivoting holes 31 and 41 of the first driving member 30 and the second driving member 40. The driving post 45 is held in the restricting slot 35. The two driving posts 1262 of the retaining members 126 are respectively received in the curved slots 373 and 473 of the first driving member 30 and the second driving member 40.

Figure 5:
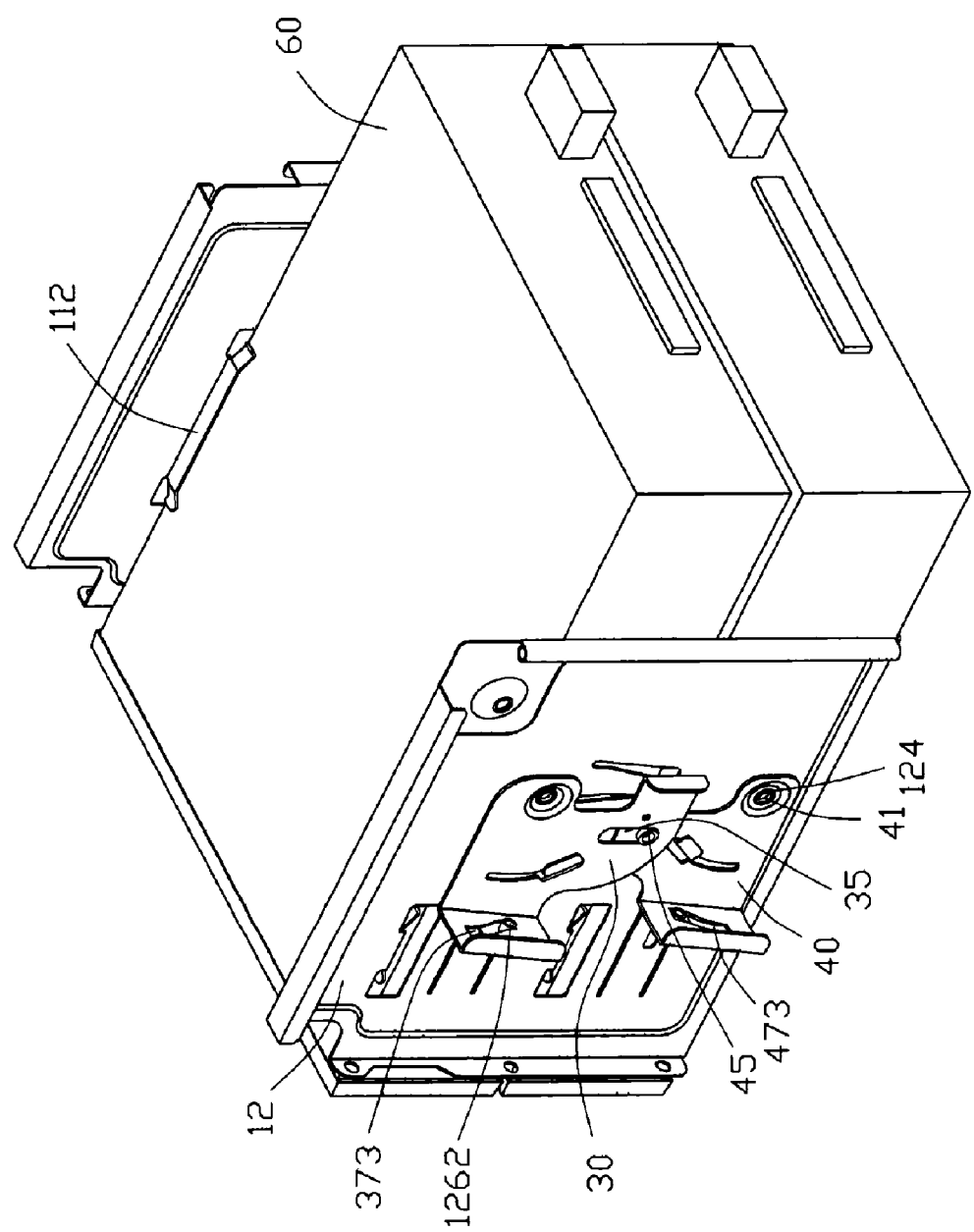
FIG. 5 is similar to FIG. 4, but the data storage device is secured in the bracket.

Referring also to FIG. 5, when using the mounting apparatus, the first driving member 30 is rotated counter-clockwise about the pivoting post 124 of the bracket 10 from a first position as shown in FIG. 5 to a second position as shown in FIG. 4. At the first position, the two driving posts 1262 are respectively located at the other ends of the curved slots 373, 473 where the distance between the curved slots 373, 473 and the side panel 12 is smallest. An edge of the restricting slot 35 urges the driving post 45 of the second driving member 40 to move in the restricting slot 35. Therefore, the second driving member 40 is rotated clockwise about the pivoting hole 41. The clasps 127a and 127b respectively slide in the corresponding arcuate slots 33 and 43 for keeping the driving member 30, 40 abutting on the side panel 12 during rotation. The driving post 1262 of each retaining member 126 slides to the an end of the corresponding curved slot 373 and 473 of the first driving member 30 and the second driving member 40 respectively. Because of the distance between the an end of each of the curved slots 373, 473 and the side panel 12 being greater than that between the other end of the curved slots 373, 473 and the side panel 12, each driving post 1262 is lifted away from the side panel 12 of the bracket 10. The retaining members 126 are thereby elastically deformed out, and the retaining tabs 1264 are drawn out of the holding space of the bracket 10. The protrusion 1292 of the positioning tongue 129 engages with the positioning hole 38b of the first driving member 30 to thereby position the first driving member 30 at the second position. Two data storage devices 60 are respectively slid into the bracket 10 along the corresponding guiding tabs 112, 122, and are positioned with the locking holes 63 in alignment with the corresponding retaining tabs 1264 of the retaining members 126. Then the first driving member 30 is rotated back to the first position. The edge of the restricting slot 35 urges the driving post 45 to force the second driving member 40 to rotate back as well. Each of the driving posts 1262 slides in the corresponding curved slot 373,473 from an end toward the other end thereof. The retaining members 126 are urged back toward the side panel 12, thereby; the retaining tabs 1264 are inserted into the corresponding locking holes 63 of the data storage devices 60. The protrusion 1292 of the positioning tongue 129 engages with the positioning hole 38a of the first driving member 30. Thus, the data storage devices 60 are mounted in the bracket 10.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for retaining a data storage device in a computer, the data storage device defining a locking hole therein, the mounting apparatus comprising:
    a bracket, comprising a first side panel and a second side panel for receiving the data storage device therebetween, a resilient retaining member formed at the first side panel, a retaining tab formed on a free end of the retaining member corresponding to the locking hole of the data storage device; and
    a driving member pivotably attached to the first side panel, an actuating portion formed on the driving member for urging movement of the retaining member, wherein the driving member is capable of rotating from a first position where the retaining tab is received in the locking hole of the data storage device to a second position where the actuating portion urges the retaining member to deform and the retaining tab disengages from the data storage device;
    wherein an arcuate slot is defined in the driving member, and a clasp is formed on the first side panel, the clasp movably engaging with the driving member at the arcuate slot for keeping the driving member abutting on the first side panel while rotating.

2. The mounting apparatus as described in claim 1, wherein the driving member is capable of rotating at a plane parallel to the first panel, while the free end of the retaining member moves outward perpendicularly to the first panel, and the retaining tab recedes from the locking hole of the data storage device.

3. The mounting apparatus as described in claim 1, wherein a retaining post is formed on the retaining member, and a curved slot is defined in the actuating portion, the curved slot engaging with the retaining post for urging movement of the retaining member.

4. The mounting apparatus as described in claim 3, wherein the curved slot is slanted with respect to the first side panel.

5. The mounting apparatus as described in claim 4, wherein a distance from an end of the curved slot to the first side panel is greater than a distance from another end of the curved slot to the first side panel.

6. The mounting apparatus as described in claim 1, wherein a pivoting post is formed on the first side panel, and a pivoting hole is defined in the driving member corresponding to the pivoting post.

7. The mounting apparatus as described in claim 1, wherein a resilient positioning tongue is formed on the first side panel, a protrusion extends from a free end of the positioning tongue, and the driving member defines at least one recess corresponding to the protrusion.

8. The mounting apparatus as described in claim 1, wherein the bracket further comprises a bottom panel, and the two side panels are perpendicularly formed on opposite sides of the bottom panel.

9. A bracket assembly, comprising:
    at least one data storage device defining at least one locking hole;
    a bracket for mounting the at least one data storage device, comprising a first side panel and a second side panel, a pair of resilient retaining members formed on a first side panel, at least one retaining tab formed on each retaining member corresponding to the at least one locking hole of the data storage device; and
    a pair of driving members attached to an outer side of the first side panel, comprising a first driving member and a second driving member, an actuating portion formed on each driving member for urging movement of a corresponding one of the retaining members, wherein the second driving member is driven by the first driving member, the first driving member and the second driving member are capable of moving along a plane parallel to the first side panel to urge each retaining member to deform out from the first side panel;
    wherein a retaining post is formed on each retaining member, and curved slot is defined in each actuating portion engaging with each retaining post urging movement of the retaining member.

10. The bracket assembly as described in claim 9, wherein each curved slot is slanted with respect to the first side panel.

11. The bracket assembly as described in claim 10, wherein a distance from an end of each curved slot to the first side panel is greater than a distance from another end of each curved slot to the first side panel.

12. The bracket assembly as described in claim 9, wherein the driving members are respectively pivotably attached on the first side panel.

13. The bracket assembly as described in claim 12, wherein two pivoting posts are formed on the first side panel, and a pivoting hole is defined in each driving member corresponding to each pivoting post.

14. A mounting apparatus for retaining data storage devices each defining a locking hole therein, the mounting apparatus comprising:
- a bracket comprising a first side panel and a second side panel cooperatively forming therebetween a space configured for retaining the data storage devices therein, a pair of resilient retaining members being formed at the first side panel, each of the retaining members having a retaining tab configured for inserting into the locking hole of one of the data storage devices; and
- first and second driving members pivotably attached to the first side panel, each driving member comprising an actuating portion movably engaging with one of the retaining members, the first driving member having a portion movably engaging with the second driving member, wherein the first and second driving members are capable of rotating relative to the first side panel from a locked position where the retaining tabs extend into the space to a released position where the actuating portions urge the retaining member to deform to draw the retaining tabs out away from the space;
- wherein when the first driving member is rotated in a first direction, the second driving member is driven by the first driving member to rotate in a second direction reverse to the first direction.

15. The mounting apparatus as described in claim 14, wherein a restricting slot is defined in one of the first and second driving members, and a driving post is formed in the other one of the first and second driving members and slidably received in the restricting slot.

16. The mounting apparatus as described in claim 14, wherein the retaining member has a free end, and the actuating portion has a guideway movably engaging with the free end of the retaining member, the guideway having a near point where the retaining member engages with the guideway when the driving members are located at the locked position and a far point where the retaining member engages with the guideway when the driving members are located at the released position, a distance from the far point to the first side panel being greater than a distance from the near point to the first side panel.

17. The mounting apparatus as described in claim 14, wherein the second side panel forms a plurality of resilient tongues configured for abutting against the data storage devices.

* * * * *